(12) United States Patent
Zhou

(10) Patent No.: US 10,847,155 B2
(45) Date of Patent: Nov. 24, 2020

(54) FULL DUPLEX COMMUNICATION FOR CONVERSATION BETWEEN CHATBOT AND HUMAN

(71) Applicant: Microsoft Technology Licensing, LLC, Redmond, WA (US)

(72) Inventor: Li Zhou, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 78 days.

(21) Appl. No.: 16/124,077

(22) Filed: Sep. 6, 2018

(65) Prior Publication Data
US 2019/0206397 A1 Jul. 4, 2019

(30) Foreign Application Priority Data

Dec. 29, 2017 (CN) .......................... 2017 1 1487228

(51) Int. Cl.
*G10L 13/00* (2006.01)
*G10L 15/22* (2006.01)
*G10L 15/26* (2006.01)
*G10L 13/08* (2013.01)
*G10L 13/06* (2013.01)
*G10L 15/18* (2013.01)
*G10L 15/34* (2013.01)

(52) U.S. Cl.
CPC .............. *G10L 15/22* (2013.01); *G10L 13/08* (2013.01); *G10L 15/26* (2013.01); *G10L 13/00* (2013.01); *G10L 15/18* (2013.01); *G10L 15/34* (2013.01)

(58) Field of Classification Search
CPC ......... G10L 15/22; G10L 15/26; G10L 13/08; G10L 13/00; G10L 15/18; G10L 15/34

USPC ......................................................... 704/262
See application file for complete search history.

(56) References Cited

U.S. PATENT DOCUMENTS

| 2015/0100316 A1 | 4/2015 | Williams et al. |
| 2016/0148610 A1 | 5/2016 | Kennewick et al. |
| 2017/0221486 A1* | 8/2017 | Kurata .................... G10L 13/00 |

OTHER PUBLICATIONS

"International Search Report and Written Opinion Issued in PCT Application No. PCT/US18/065314", dated Mar. 8, 2019, 13 Pages.

* cited by examiner

*Primary Examiner* — Thierry L Pham
(74) *Attorney, Agent, or Firm* — Schwegman Lundberg & Woessner, P.A.

(57) ABSTRACT

The present disclosure provides a technical solution related to full duplex communication for voice conversation between chatbot and human beings. More particularly, by using such technique, the conventional conversation mode with message as center in the art is subverted so as to realize a conversation mode in full duplex mode. The entire expression that a user intents to express may be predicted when obtaining intermediate result of speech recognition, and response messages may be generated in advance based on the predicted whole expression so that the generated response message may be output immediately when a response condition is satisfied, e.g., it is determined that a user has finished a paragraph of talking. With such technical solution, the latency from the end of voice input of a user and the start of speech output of a chatbot may be minimized.

13 Claims, 10 Drawing Sheets

FULL DUPLEX COMMUNICATION FOR CONVERSATION BETWEEN CHATBOT AND HUMAN

CLAIM OF PRIORITY

This application claims priority under 35 USC 119 to Chinese Application No. 201711487228.8, filed Dec. 29, 2017, the disclosure of which is incorporated herein in its entirety.

BACKGROUND

A chatbot may directly communicate with human beings as users by using human being's languages. A typical implementation scenario applying chatbot may be the artificial intelligence (AI) technique. The chatbot may be often used in APPs, such as instant message, social applications, smart phone personal assistant, and IoT (Internet of things) intelligent devices. It may be convenient to understand users' intention and provide information that the user wants by voice conversation between the chatbot and the user, so that the display on screen may be omitted.

The chatbot in the art still uses messages as construction unit for conversation during the voice conversation with a user and thus there is a long way to realize the imitation of conversation between human beings.

BRIEF SUMMARY

The embodiments of the present disclosure is provided to give a brief introduction to some concepts, which would be further explained in the following description. This Summary is not intended to identify essential technical features or important features of the subject as claimed nor to limit the scope of the subject as claimed.

A technical solution related to full duplex communication for voice conversation between chatbot and human beings is disclosed. More particularly, by using such technique, the conventional conversation mode with message as center in the art is subverted so as to realize a conversation mode in full duplex mode. The entire expression that a user intents to express may be predicted when obtaining intermediate result of speech recognition, and response messages may be generated in advance based on the predicted whole expression so that the generated response message may be output immediately when a response condition is satisfied, e.g., it is determined that a user has finished a paragraph of talking. With such technical solution, the latency from the end of voice input of a user and the start of speech output of a chatbot may be minimized.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
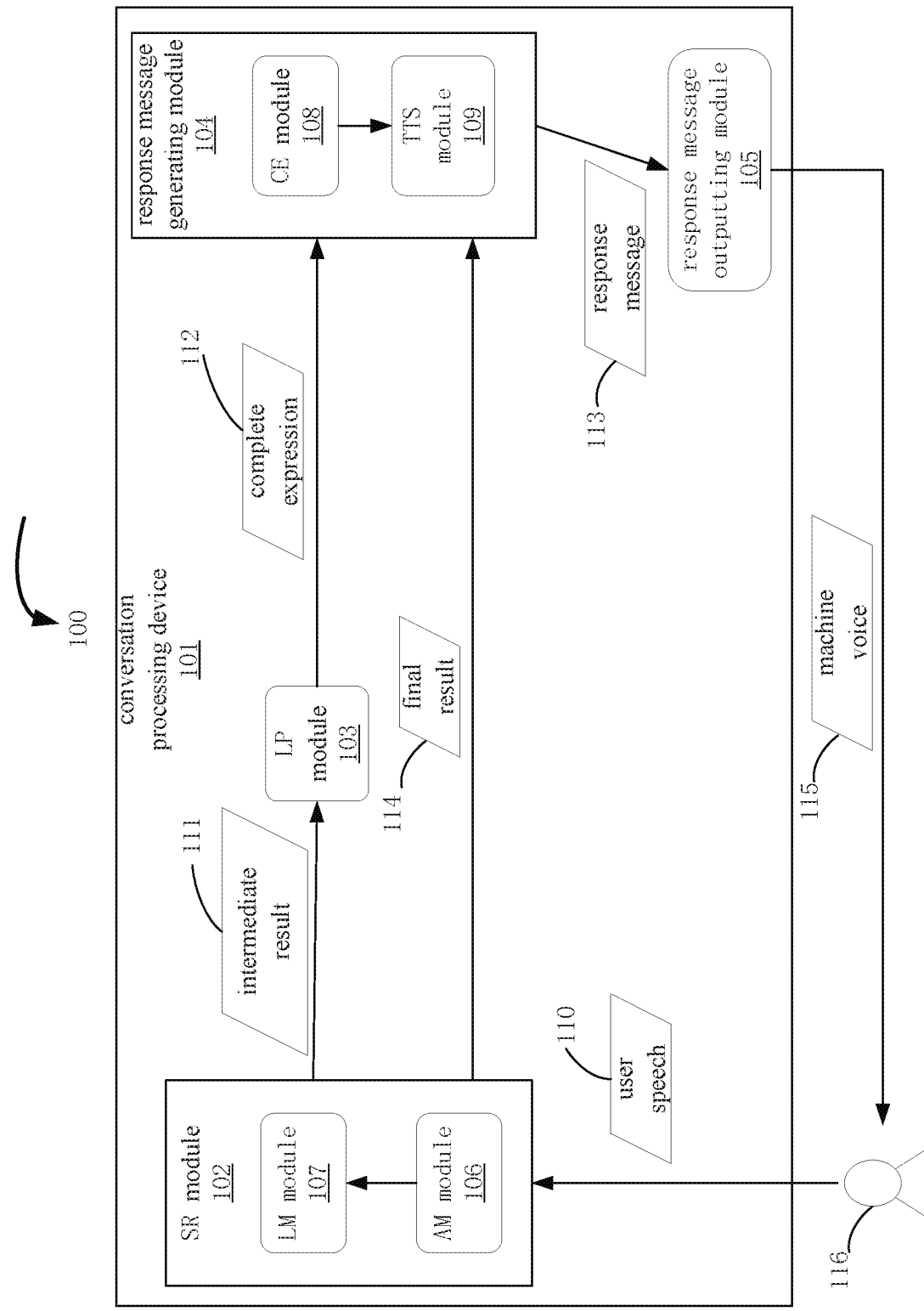
FIG. 1 is an exemplary block diagram of a conversation processing device of embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, systems, and computer program products related to recommendation in using of mobile devices.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

The present disclosure may involve improvement on the way of conversation between a chatbot and a user. The chatbot may mainly apply three components independent from each other to construct a conversation with the users. These components may include: a Speech Recognition (SR) module, a Conversation Engine (CE) module, and a Text To Speech (TTS) module. During the inputting of speech by a user, the conventional chatbot may always play a role of listening, and convert the speech input into text by using a speech recognition module. Then, the chatbot may perform processing to generate a response message in text according to the converted text after determining that a user finishes a sentence or a paragraph, and then a speech output may be performed by the text to speech module.

It can be seen from the above processing procedure that, although the user seems to be in a voice conversation with a chatbot, such procedure is actually a speech interaction based on messages. Therefore, such way of conversation is different from the way of conversation between human beings.

Interactions are performed in real time during conversation between human beings. More particularly, when one party in the conversation is talking, the other party is thinking on the meaning that the one party who is currently talking wants to express, and preparing the language of answer, which would be replied to the one party when the one party has finished one sentence or one paragraph. Sometimes, the talking of one party may be interrupted directly even when the one party has not finished his talking, and the answer may be replied to the one party directly then. That is to say, during conversation between human beings, thinking is performed as the talking is performed.

Comparing with such situation, a chatbot cannot make the total imitation on the way of thinking while talking of human beings during the speech interaction based on messages. More particularly, the chatbot has to perform a processing of preparing the language for answer after waiting till the user finishes a whole sentence or paragraph in each time for response. Such procedure may certainly induce a feeling of pause in the conversation and the feeling of conversation between human beings may be impossible to be imitated well. When a user is performing a voice conversation with conventional chatbot in the art, the user may feel like taking turns at talking with another person via two way radios. Therefore, such solution with messages at center brings limitation on the various and naturalness of voice conversation between a chatbot and human beings.

The embodiments of the present disclosure propose a mechanism for processing messages of speech conversation in full duplex communication. More particularly, a chatbot may perform prediction on the intention a user wants to express and prepare a response message synchronously while listening to the speech input by the user. The chatbot may predict the whole or complete expression that a user wants to express based on an intermediate result of speech recognition and perform the preparation on the response messages in advance based on the predicted whole or complete expression, during a conversation between the chatbot and human beings. Therefore, when a certain condition for response is satisfied, e.g., a user finishes a paragraph of speech and thus a final result of speech recognition is generated, a response message may be output in time. With such solution, the feeling of conversation between human beings may be imitated better.

More particularly, during a voice conversation between two parties, a pause of speech may be generated after one party has completed the expression of a paragraph of speech (e.g., one sentence, several sentences, or a part of a sentence, or the like). Such pause of speech may be a case that one party has finished a piece of intended expression and waits for a response from the other party. The paragraph of speech of one party and the response to that paragraph of speech from the other party may constitute one turn of conversation.

The above speech recognition module is capable to recognize such pause and determine that a user has completed a paragraph of speech when such pause is long enough. At that time, a whole paragraph of the result of speech recognition may be output with respect to that paragraph of speech. That result of speech recognition may be the final result described above. The intermediate result described above may refer to a result generated by a processing of speech recognition before the end of a paragraph of speech.

As shown in FIG. 1, which is an exemplary block diagram 100 of a conversation processing device of embodiments of the present disclosure, a conversation processing device 101 in FIG. 1 may be implemented as or provided in a small portable (or mobile) electronic device, such as cell phone, personal digital assistant (PDA), personal media player device, wireless network player device, personal headset device, IoT (internet of things) intelligent device, dedicate device or combined device containing any of functions described above. The conversation processing device 101 may be also implemented or provided in a personal computer including configurations of laptop computer and non-laptop computer. Furthermore, the conversation processing device 101 may be further implemented as a server on internet or provided in a server on internet. Such server may be implemented in one or more computer systems (distributed server), or implemented as a server based on cloud technology. Such servers may be connected with user clients via internet to receive voice output of the users collected by the user clients, and generate response messages after conversation processing on the voice output. Then the generated response messages may be returned to the user clients to be output to the users. The conversation processing device 101 of embodiments of the present disclosure may implement the functions of the chatbot described above.

The conversation processing device 101 may include: a speech recognition (SR) module 102, a language predicting (LP) module 103, a response message generating module 104, and a response message outputting module 105.

The speech recognition module 102 may be configured to perform speech recognition on a user speech 110 input by a user 116 to generate an intermediate result 111 of speech recognition. Furthermore, when a paragraph of speech is finished, the speech recognition module 102 may output a final result 114 of speech recognition. More particularly, the speech recognition module 102 may include an Acoustic Model (LM) module 106 and a Language Model (LM) module 107. The acoustic model module 106 may be configured to Output a speech recognition result in a form of phonetic symbol sequence. The language model module 107 may generate a speech recognition result in a form of text based on the phonetic symbol sequence output by the acoustic model module 106.

The language predicting module 103 may be configured to predict a whole expression 112 according to the intermediate result 111. More particularly, the intermediate result may be an intermediate result in the form of phonetic symbol sequence output by the acoustic model module 106 and/or an intermediate result in a form of text output by the language model module 107.

The response message generating module 104 may be configured to generate a response message 113 according to the whole expression. The response message generating module 104 may include: a Conversation Engine (CE) module 108 and a Text To Speech (TTS) module 109. More particularly, the conversation engine module 108 may be configured to generate the content of a response message according to a predicted whole expression. The response messages output by the conversation engine module 108 may be generally in a form of text, and then the text to speech module 109 may generate a response message in a form of audio segment. Furthermore, the response message generating module 104 may generate a response message according to the final result 114.

The response message outputting module 105 may be configured to output a response message 113 to a user 116 in response to satisfying a response condition. More particularly, a response message 113 may be output to a user as machine voice 115. Furthermore, the response message 113 may be output as voice or displayed as text. For example, in some scenario, a user performs a communication with a chatbot via speech, while the chatbot may always response in a form of text message (e.g., a response message may be displayed on a screen/plane). If the technical solutions of embodiments of the present disclosure are applied in this chatbot, the chatbot may output response more quickly than a conventional chatbot does in a mode of two way radio during conversation, the user may have a feeling of performing conversation with human beings.

The response message outputting module 105 may be mainly configured to control the output of the response message 113. The response condition cited herein may be the generation of a final result 114 of speech recognition. That is to say, when the speech recognition module 102 recognizes a final result 114, the outputting of the response message 113 may be triggered. In practical implementation, the response conditions cited above may further include: the predicted whole expression and the final result 114 satisfy a threshold of similarity therebetween, i.e., the predicted whole expression 112 is relatively accurate. When such condition is satisfied, a response message, which is prepared in advance, may be output. If the predicted whole expression 112 does not satisfy the threshold of similarity, it may be triggered that the response message generating module 104 generates a response message 113 based on the final result 114 and output the response message 113 in a conventional way.

Figure 2:
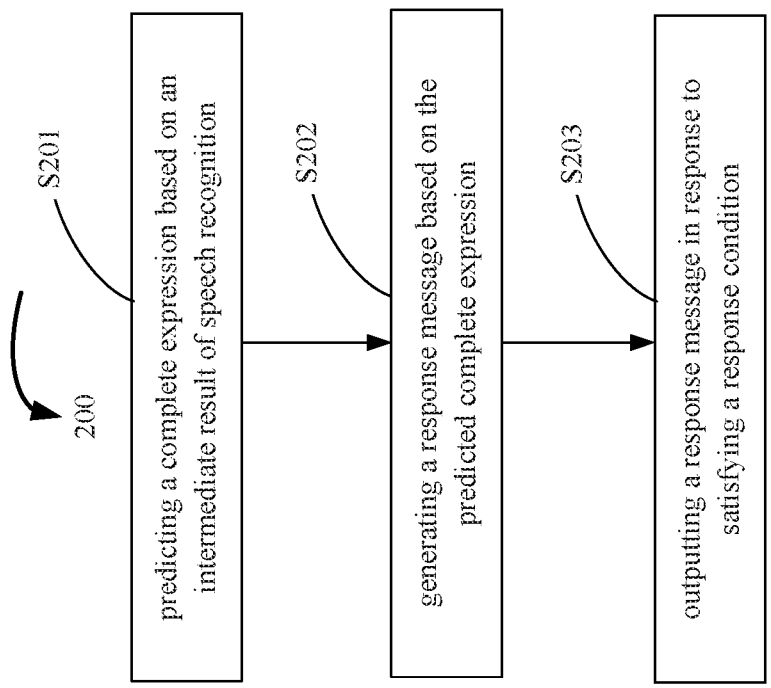
FIG. 2 is a schematic flowchart showing a conversation processing method of embodiments of the present disclosure.

As shown in FIG. 2, which is a schematic flowchart 200 showing a conversation processing method of embodiments of the present disclosure, the conversation processing method may include:

S201, predicting a complete expression based on an intermediate result of speech recognition. This step of S201 may be performed by the above speech prediction module 102 and a language predicting module 103.

S202, generating a response message based on the predicted complete expression. This step of S202 may be performed by the above response message generating module 104.

S203, outputting a response message in response to satisfying a response condition. This step of S203 may be performed by the above response message outputting module 105.

In the above, description has been made on the basis voice processing mechanism of embodiments of the present disclosure, conversation processing method and apparatus of embodiments of the present disclosure, which may subvert the conventional conversation mode with message as center in the art so as to realize a conversation mode in full duplex mode. The entire expression that a user intents to express may be predicted when obtaining speech segment information (intermediate result of speech recognition), and response messages may be generated in advance based on the predicted whole expression, so that the generated response message may be output immediately when a response condition is satisfied, e.g., it is determined that a user has finished a paragraph of speech. With such technical solution, the latency from the end of a speech input of a user and the start of speech output of a chatbot may be minimized, and a prompt response may be realized.

Figure 3:
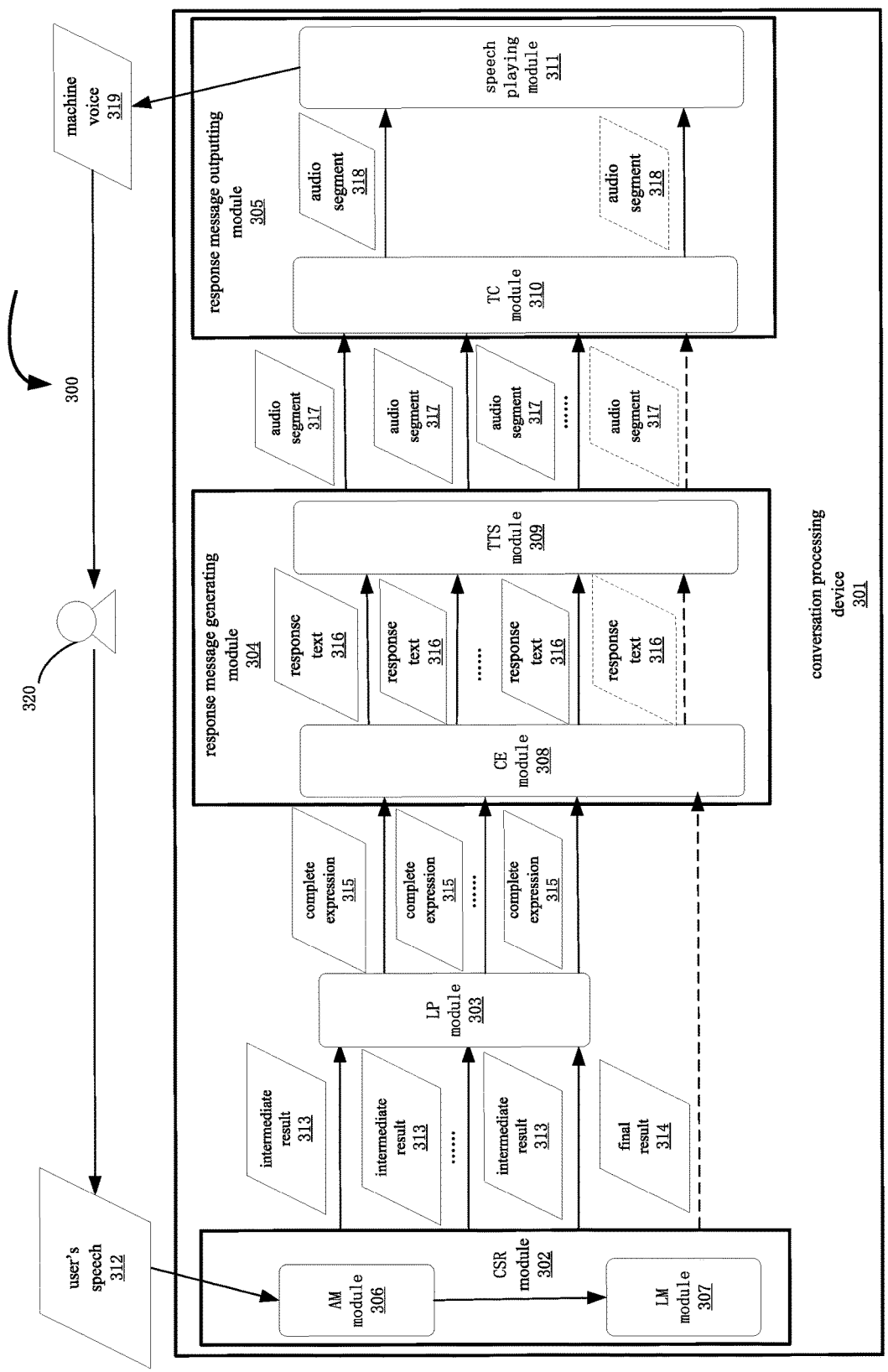
FIG. 3 is an exemplary block diagram of another conversation processing device of embodiments of the present disclosure.

In the following, explanation would be made on the technique of embodiments of the present disclosure with detailed implementation. As shown in FIG. 3, which is an exemplary block diagram 300 of another conversation processing device of embodiments of the present disclosure, the conversation processing device 301 may include: a Continuous Speech Recognition module 302, a language predicting module 303, a response message generating module 304, and a response message outputting module 305.

The continuous speech recognition module 302 may be configured to perform continuous speech recognition on user's speech 312 input by a user 320 to generate one or more intermediate results 313 of speech recognition and a final result 314. In practical implementations, an intermediate result 313 may be output each time when one character or one word is recognized, and this intermediate result 313 may be a language segment from the start of a user's speech 312 to the character or word currently recognized. For example, it may be assumed that a complete user's speech 312 is "I want to drink some water", the above intermediate results 313 may be "I", "I want to", and "I want to drink", and the final result 314 is "I want to drink some water".

The continuous speech recognition module 302 may include an Acoustic Model module 306 and a Language Model module 307. More particularly, the acoustic model module 306 may output a speech recognition result in a form of phonetic symbol sequence. The language model module 307 may generate a speech recognition result in a form of text based on the phonetic symbol sequence output by the acoustic model module 406. The acoustic model module 306 and the language model module 307 may also output intermediate results 313 and final result 314 in the form of phonetic symbol sequence and text.

The language predicting module 303 may be configured to predict one or more complete expressions 315 according to the one or more intermediate results 313.

The response message generating module 304 may be configured to generate one or more response messages according to one or more complete expressions 315. In the embodiments of the present disclosure, the response messages may include response messages in a form of text (shown as response text 316 in the Figs.) and response messages in a form of audio (shown as audio segment 317).

The response message generating module 304 may include: a Conversation Engine module 308 and a Text To Speech module 309. More particularly, the conversation engine module 308 may be configured to generate a response message in a form of text according to a predicted complete expression 315, i.e., a response text 316, and then the text to speech module 309 may generate a response message in a form of audio segment according to the response text 316, i.e., audio segment 317. Furthermore, the response message generating module 304 may generate a response message according to the final result 314.

The response message outputting module 305 may be configured to compare a final result 314 with one or more complete expressions 315 in response to the generating the final result 314 of speech recognition. If there are one or more complete expressions 315 satisfying a similarity threshold, a response message may be selected from one or more response messages corresponding to the one or more complete expressions 315 satisfying the similarity threshold so as to be output. If the predicted complete expressions 315 do not satisfy the similarity threshold, the response message generating module 304 may be launched to generate a response message based on the final result 314 and output that response message, similarly with the technical solution in the art.

The response message outputting module 305 may include a turn coordinator module 310 and a speech playing module 311. More particularly, the turn coordinator module 310 may be configured to calculate similarity between a plurality of complete expressions 315 and a final result 314 to select one or more complete expressions 315 satisfying a similarity threshold when the final result 314 is generated, and select an audio segment 317 generated based on a complete expression 315 according to a preset condition for selection, so as to send the selected audio segment 317 to a speech playing module 311 for outputting, or actuate the response message generating module 304 to generate a response message according to the final result 314 in the case that all of the complete expressions 315 are not good enough. Such response messages may include a response text 316 and an audio segment 317 generated based on the final result 314 (such as the processing procedure as shown with dash lines in the bottom of FIG. 3). Then, the audio segment 317 based on the final result 314 may be sent to the speech playing module 311 as output. The speech playing module 311 may be configured to play the audio segment 317 as machine voice 319 when the turn coordinator module 310 determines the audio segment 317 to be output. Therefore, the user 320 may hear the machine voice 319 as response to the user's speech 312, and thus one turn of conversation ends.

More particularly, the selection on response messages corresponding to a plurality of complete expressions 315 satisfying the similarity threshold by the turn coordinator module 310 may use the following conditions:

Condition 1, the response message corresponding to the complete expression 315, whose similarity with the final result 314 is highest. The higher the similarity is, the closer the complete expression 315 is to the final result, and thus the more accurate the corresponding response message is.

Condition 2, a response, which is generated earliest. As shown in FIG. 3, after generating each intermediate result 313, a series of processing may be performed to obtain the final response message. One thread may be established for one intermediate result 313 to perform a series of subsequent processing. However, before the generating of the final result 314, it may be uncertain that each thread can complete a series of processing jobs to generate the final response message. If a response message corresponding to the complete expression 315 satisfying the similarity threshold is still in a procedure of generating, it may take time to wait for the processing result of the thread. In order to make quick response to the user, response message from a thread among these threads, whose processing is quicker, may be selected as output.

The turn coordinator module 310 may perform the selection according to one of the above conditions or may use both of the two above conditions to perform the selection. For example, a response whose comprehensive ranking of the similarity and speed for generating response message may be selected as output.

Furthermore, as described above, when each intermediate result 313 is generated, a series of processing may be launched to generate response messages. One thread may be established for each intermediate result 313 to perform a series of subsequent processing. A thread management module may be used to manage these threads.

Figure 4:
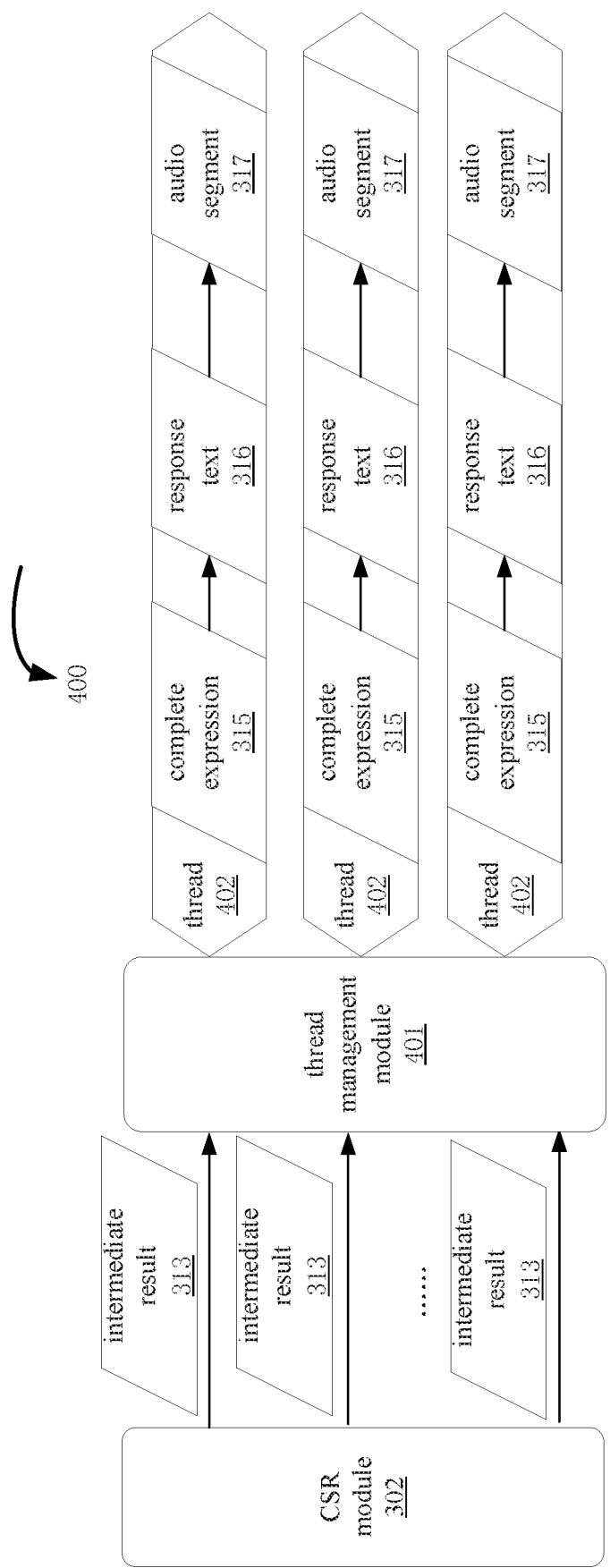
FIG. 4 is a schematic block diagram showing application of thread management of embodiments of the present disclosure.

As shown in FIG. 4, which is a schematic block diagram 400 showing application of thread management of embodiments of the present disclosure, the thread management module 401 may establish a thread 402 in response to the continuous generation of each intermediate result 313 by the continuous speech recognition module 302. Each thread 402 may parallel call the language predicting module 303 to perform prediction on the complete expressions 315 and call the response message generating module 304 to perform generation of the response messages. More particularly, the conversation engine module 308 may be called to generate a response text 316 and then the text to speech module 309 may be called to generate an audio segment 317 as the output result of this thread 402.

Figure 5:
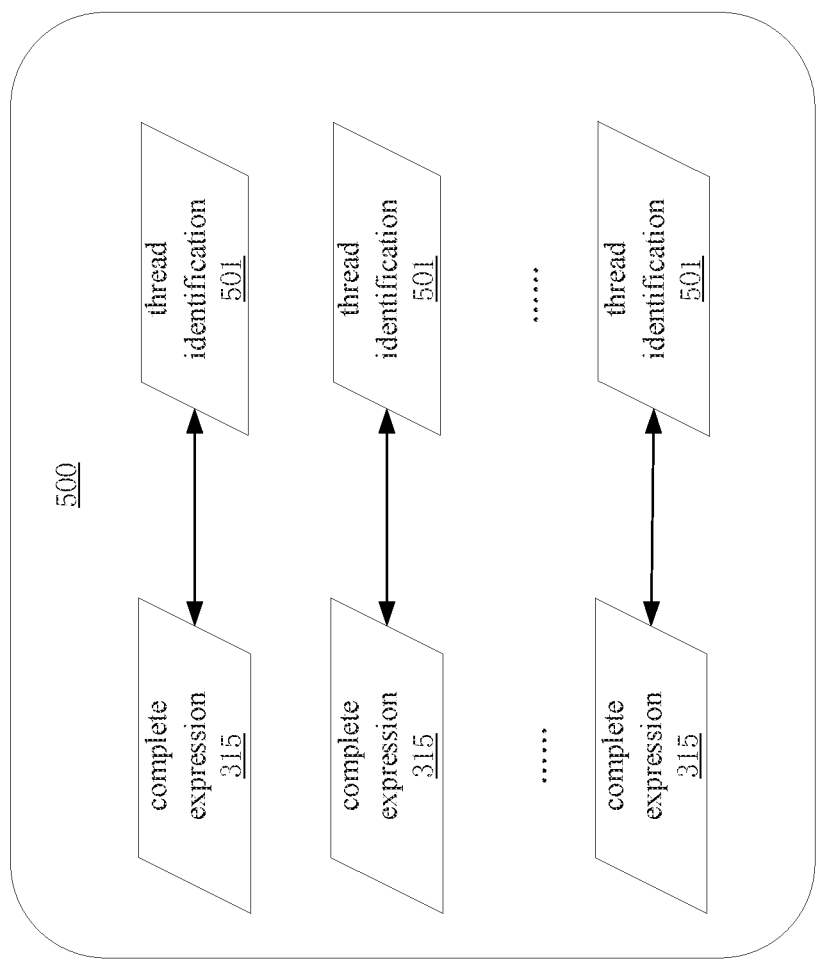
FIG. 5 is a schematic block diagram showing data structure of thread management of embodiments of the present disclosure.

As shown in FIG. 5, which is a schematic block diagram 500 showing data structure of thread management of embodiments of the present disclosure, when the final result 314 is generated, the response message outputting module 305 may select the processing result of one thread according to the comparison result between the final result 314 and the predicted complete expression 315. In order to facilitate the access to the threads, the data structure as shown in FIG. 5 may be used to record the mapping relationship between a thread identification 501 of a thread 402 and a complete expression 315, and the complete expression 315 and the thread identification 501 may be stored associated with each other, so that when a complete expression 315, which satisfies a mapping condition, is found, the thread corresponding thereto may be found correspondingly so as to further obtain or wait for the processing result of that thread.

Furthermore, the thread management module 401 may be further configured to perform dynamical maintenance and management on each thread 402. The thread management module 401 may calculate a gain of the complete expression 315 predicted by each thread, and determine whether each thread 402 needs to be retained or abandoned. More particularly, the gain may reflect the indexes in the following two indexes.

1) accuracy of prediction on complete expression. The higher the accuracy of the predicted complete expression is, the more valuable the generated response message is. The accuracy of prediction as cited herein may be calculated before the generation of the final result. During the prediction on a complete expression by the language predicting module 303, an estimation on the accuracy of prediction on that complete expression may be obtained.

2) time gap which can be covered by a complete expression. The time gap as cited herein may refer to a time gap from the time when an intermediate result is obtained by recognition to the time when a final result is obtained by recognition. The earlier the complete expression is recognized, the more time that may be used to prepare the response message, and the more valuable the predicted complete expression thereof is.

In practical implementations, gain may be calculated based on one of the above two aspects, or both of the above two aspects.

The thread management module 401 may perform dynamical management on each thread 402 according to the obtained gain for each thread and current computation resources. As an example of extremity, if the computer resources are rich enough, all threads may be retained. As another example of extremity, if the computer resources are extremely poor, the thread with highest gain may be retained or all threads may be abandoned. In a case that all threads are abandoned, a response message may be generated based on a final result when the final result comes. The thread management module 401 may balance the computation resources and conversation efficiency between these two cases of extremity.

Figure 6:
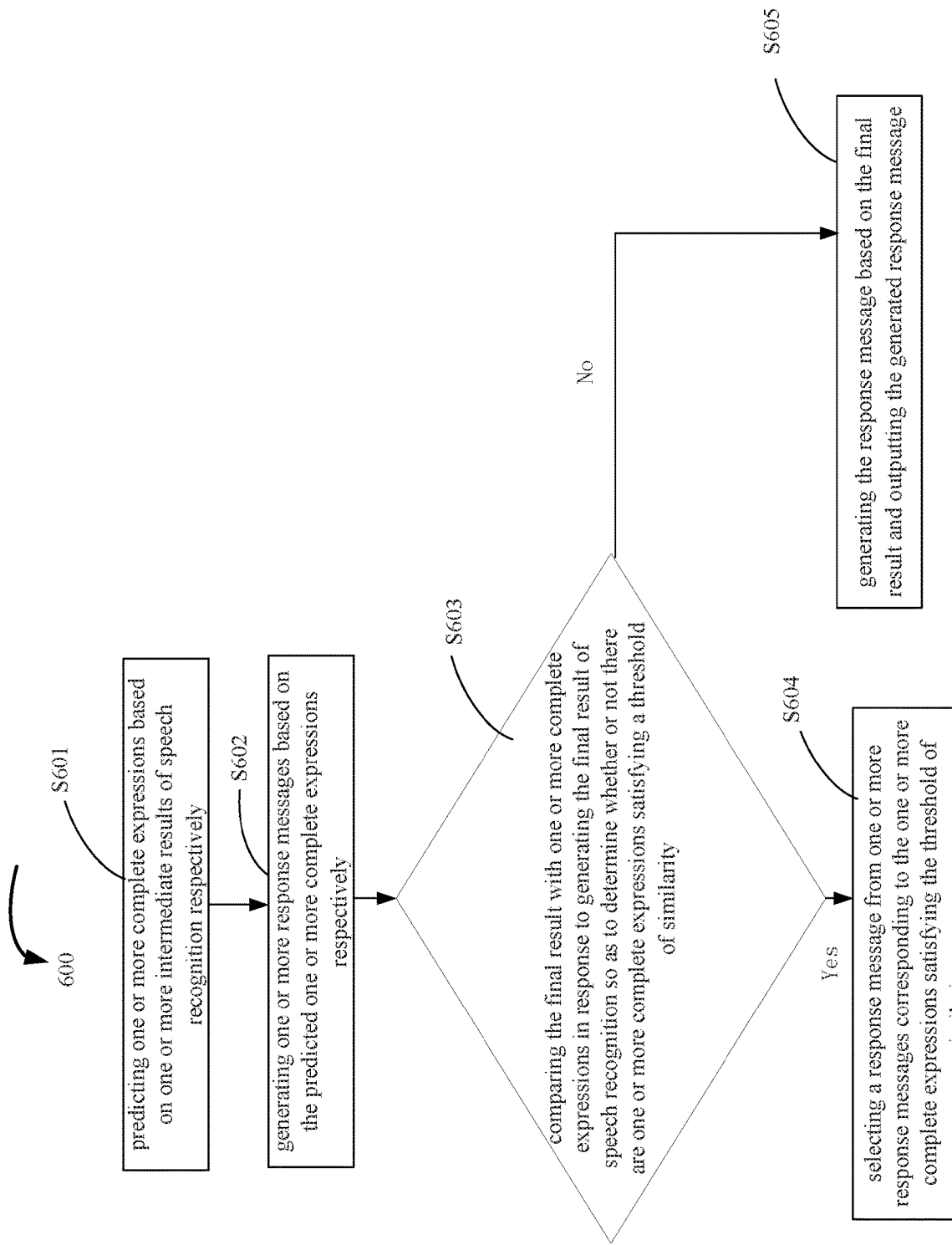
FIG. 6 is a schematic flowchart showing another conversation processing method of embodiments of the present disclosure.

As shown in FIG. 6, which is a schematic flowchart 600 showing another conversation processing method of embodiments of the present disclosure, the conversation processing method may include the following steps.

S601, predicting one or more complete expressions based on one or more intermediate results of speech recognition respectively. This step may be performed by the continuous speech recognition module 302 and the language predicting module 303.

S602, generating one or more response messages based on the predicted one or more complete expressions respectively. This step may be performed by the response message generating module 304.

S603, comparing the final result with one or more complete expressions in response to generating the final result of speech recognition so as to determine whether or not there are one or more complete expressions satisfying a threshold of similarity, If there are one or more complete expressions satisfying the threshold of similarity, a step of S604 is performed. If there is no complete expression satisfying the threshold of similarity, a step of S605 is performed. This step of S603 may be performed by the response message outputting module 305.

S604, selecting a response message from one or more response messages corresponding to the one or more complete expressions satisfying the threshold of similarity as output. More particularly, the turn coordinator module 310 may be used to select a plurality of response messages as output according to the conditions for selecting response messages as described above. This step of S604 may be performed by the response message outputting module 305.

S605, generating the response message based on the final result and outputting the generated response message. This step of S605 may be performed by the response message generating module 304 and the response message outputting module 305.

More particularly, the above steps S601 and S602 may be performed in a way of establishing one or more threads 402 based on processing of each intermediate result, and in the steps S601 and S602, maintenance and management may be dynamically performed on each thread by calculating gain of complete expression predicted by each thread. The specific of the processing on the threads may refer to the above description and may be performed by the thread management module 401.

Figure 7:
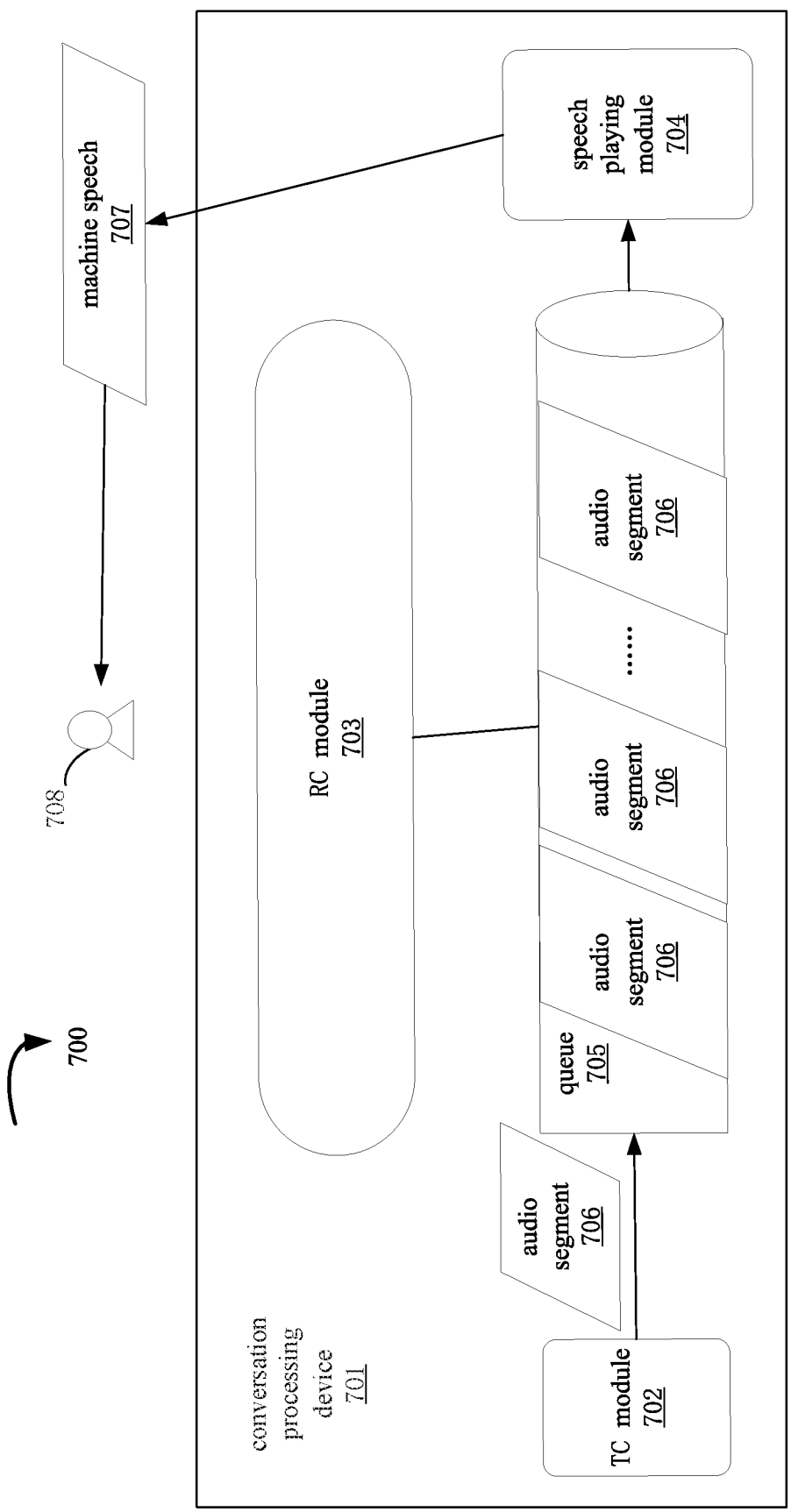
FIG. 7 is an exemplary block diagram of still another conversation processing device of embodiments of the present disclosure.

As shown in FIG. 7, which is an exemplary block diagram 700 of still another conversation processing device of embodiments of the present disclosure, the conversation processing device 701 may include: a turn coordinator (TC) module 702, a rhythm coordinator (RC) module 703, and a speech playing module 704.

The turn coordinator module 702 may be configured to obtain a plurality of response messages generated according to a user speech of each turn input by a user and write the response messages into a queue 705 in an order of generating sequence. The response message as shown in FIG. 7 is an audio segment 706. As described in the beginning part of the embodiments, one turn of conversation may be constituted of a paragraph of speech of one party of the conversation and a response to that paragraph of speech of the other party. However, in the present disclosure, the expression of "turn." as cited herein does not mean the speech paragraph of one party should be directly followed by the response to that speech paragraph of the other party. In an exemplarily embodiment, one party may pause for a while when finishing a paragraph of speech and then start another paragraph of speech. In such scenario of conversation, the other party may wait until one party finishes several continuous paragraphs of speech to perform response to each paragraph of speech respectively.

When such scenario is combined with a scenario of human-machine conversation, the conversation processing device may accumulate a plurality of response messages in queue and these response messages in the queue would not be output until a user has finished a series of conversation paragraphs. In such case, it is the time for outputting response message when it is determined that the user has finished a series of conversation paragraphs.

The conversation processing device mainly concerns the timing for outputting response messages, i.e., whether or not a conversation message should be output when a user finishes a paragraph of speech. The conversation processing device may use the same mechanism of detecting the period of pause of the user's speech to determine the timing for outputting response messages and detecting whether or not a user finishes a paragraph of speech, except that the period of pause to be detected for determining the timing of outputting response messages may be longer. For example, the conversation processing device may determine that a user has finished a paragraph of speech when detecting that the period of pause of a user is over the time of T1. Then, the conversation processing device may keep detecting the period of pause of the user, and determine it is the timing for outputting a response message if the period of pause of the user is over time of T2 (T2>T1). The specific setting for the time of T1 and T2 may be determined as needed. The detection on the period of pause of the user's speech may be performed by the continuous speech recognition module 302 as shown in FIG. 3. Then the result of the detection may be notified to the rhythm coordinator module 703. Alternatively, the detection on the period of pause of the user's speech may be performed by the rhythm coordinator module 703.

The rhythm coordinator module 703 may be configured to detect a timing of outputting a response message. Such detection by the rhythm coordinator module 703 may be done by obtaining a. detection result from the continuous speech recognition module 302, or detecting by the rhythm coordinator module 703 itself. The rhythm coordinator module 703 may be further configured to perform processing on a plurality of response messages in the queue 705 according to a preset outputting strategy for outputting response messages. The processing on a plurality of response messages in the queue 705 may include: one of a processing of outputting in queue and a processing of interrupting outputting, or one of a processing of outputting in queue and a processing of abandoning, or one of a processing of outputting in queue, a processing of interrupting outputting and a processing of abandoning. The specific processing of a processing of outputting in queue, a processing of interrupting outputting and a processing of abandoning may be as follows.

The processing of outputting in queue may include: outputting in an order of sequence of writing into the queue. The processing mode of outputting in queue may be a normal processing mode of a conversation processing device. That is to say, in general, the response messages may be output in an order of sequence in the queue. Therefore, the conversation processing device may avoid the outputting of a machine speech from being interrupted by another machine speech.

The processing of interrupting outputting may include: outputting one or more response messages immediately. When it is necessary to output an important and/or urgent response message, the processing of interrupting outputting may be performed, so as to interrupt the speech state of a user so as to output the important and/or urgent response message. Furthermore, in the processing mode of interrupting outputting, the audio segment being currently played may be erased or all audio segments before the audio segment just to be played may be deleted.

The processing of abandoning may include: abandoning one or more response messages in a queue. The processing of abandoning may be performed when the response messages written into the queue are over a preset threshold of amount and/or length.

The audio segments in a queue 705 may be output to the speech playing module 704 for playing under the control of the rhythm coordinator module 703, so as to generate a machine speech 707 to be output a user 708.

It should be noted that the response messages obtained by the above turn coordinator 702 may be the response messages generated by the conversation processing as shown in FIG. 3, or the response messages by other ways. For example, the response messages may be the response messages generated by the conventional method in the art.

Figure 8:
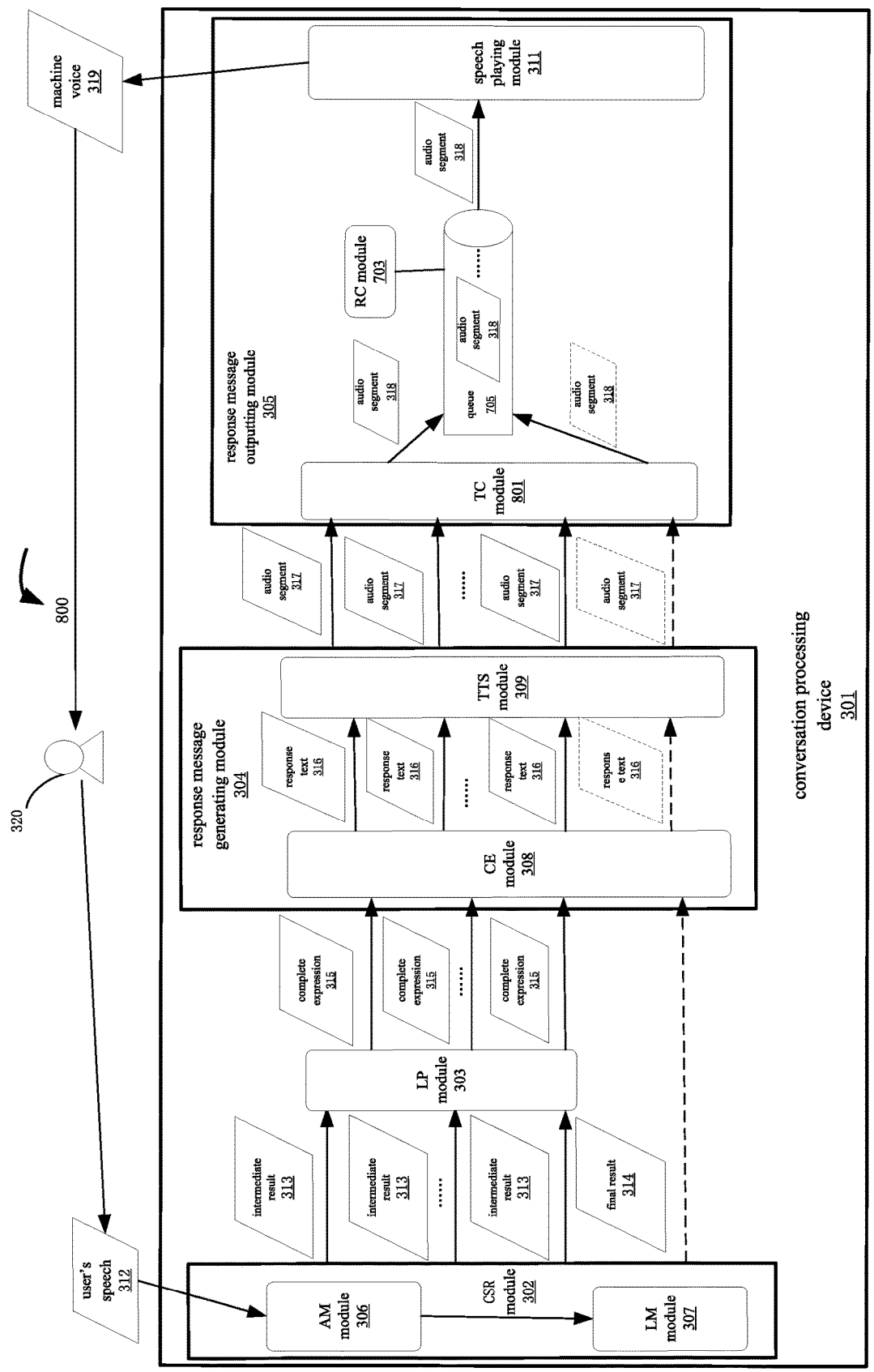
FIG. 8 is an exemplary block diagram of another conversation processing device of embodiments of the present disclosure.

As shown in FIG. 8, which is an exemplary block diagram 800 of another conversation processing device of embodiments of the present disclosure, the conversation processing device 801 in FIG. 8 may combine the conversation processing device 301 as shown in FIG. 3 and the conversation processing device 701 as shown in FIG. 7. In the block diagram 800 shown in FIG. 8, original reference numbers in FIG. 3 and FIG. 7 may be used for the modules with same functions as those in FIG. 3 and FIG. 7. More particularly, the turn coordinator module 801 may combine the functions of the turn coordinator module 310 in FIG. 3 and the turn coordinator module 702 in FIG. 7. Therefore, the turn coordinator module 801 may be labeled as the turn coordinator module 801 in FIG. 8.

The above turn coordinator module 801 and the rhythm coordinator module 703 may be included in the response message outputting module 305. When the turn coordinator module 801 determines an audio segment 318 of each turn, the audio segment 318 may be written into a queue 705. Then, the rhythm coordinator module 703 may detect a timing for outputting the response message, and perform a control on the outputting of response according to the preset outputting strategy of outputting response messages. The specific procedure of the processing may refer to the description on the conversation processing device in FIG. 7.

Examples of Implementation

Figure 9:
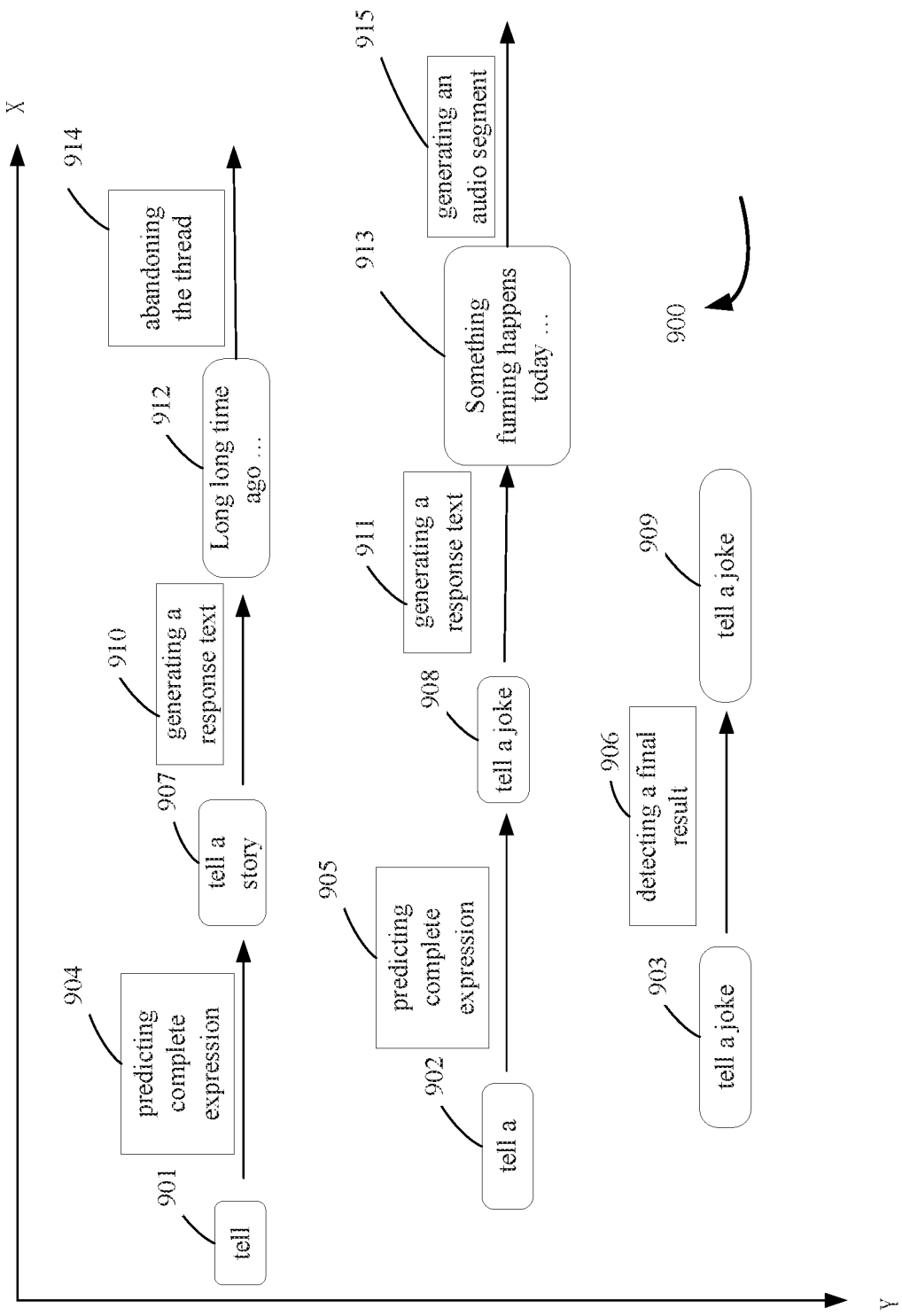
FIG. 9 is an exemplary block diagram of an implementation example of conversation processing device of embodiments of the present disclosure.

As shown in FIG. 9, which is an exemplary block diagram 900 of an implementation example of conversation processing device of embodiments of the present disclosure, a paragraph of "tell a joke" may be used as an example of complete paragraph of speech of a user in FIG. 9 so as to explain an example of conversation processing procedure of embodiments of the present disclosure. The axis of X and the axis of Y in FIG. 9 may represent the timeline of the processing performed by a conversation processing device, such as predicting complete expression, preparing response messages, and the timeline of the processing of speech recognition by the conversation processing device.

When a user is saying the expression of "tell a joke", the continuous speech recognition module 302 may continuously performing the processing of speech recognition and obtain an intermediate result of "tell" 901, an intermediate result of "tell a" 902, and a final result of "tell a joke" 903. Threads may be established for the intermediate result of "tell" 901 and the intermediate result of "tell a" 902, respectively so as to start the succeeding processing such as the processing of predicting complete expression.

Thread one, performing a processing of predicting complete expression 904 on the generated intermediate result of "tell" 901 so as to generate a complete expression of "tell a story" 907 by predicting, and then a processing of generating a response text 910 may be performed to generate the content text of the story of "Long long time ago . . . " 912 as a response text.

Thread two, perform a processing of predicting complete expression 905 on the generated intermediate result of "tell a" 902, so as to generate a complete expression of "tell a joke" 908 by predicting, and then a processing of generating a response text 911 may be performed to generate a response text of "Something funning happens today . . . " 913, and then a processing of generating an audio segment 915 may be performed.

There is time difference between the time for the processing of thread one and. thread two, and thus when a final result of "tell a joke" 909 is recognized by the processing 906 of detecting a final result , the processing of comparing the final result of "tell a joke" 909 with the predicted complete expression of "tell a story" 907 and the predicted complete expression of "tell a joke" 908 so as to perform a judgement on similarity therebetween. As a result of the judgement, it is found that the complete expression of "tell a joke" 908 and the final result of "tell a joke" 909 are same, and the similarity therebetween is the highest, while the complete expression of "tell a story" 907 is far away from the final result of "tell a joke" 909. Therefore, the processing of abandoning 914 may be performed on the thread for the complete expression of "tell a story" 907, i.e., the thread one. Then, an audio segment generated by the thread two may be output in response to the generating of the final result of "tell a joke" 909. If the thread two has not finished the generating of the audio segment when the final result of "tell a joke" 909 is generated, time may be taken to wait for the output result of the thread two.

Embodiments

In some examples, one or more components or modules and one or more steps as shown in FIG. 1 to FIG. 10 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 10:
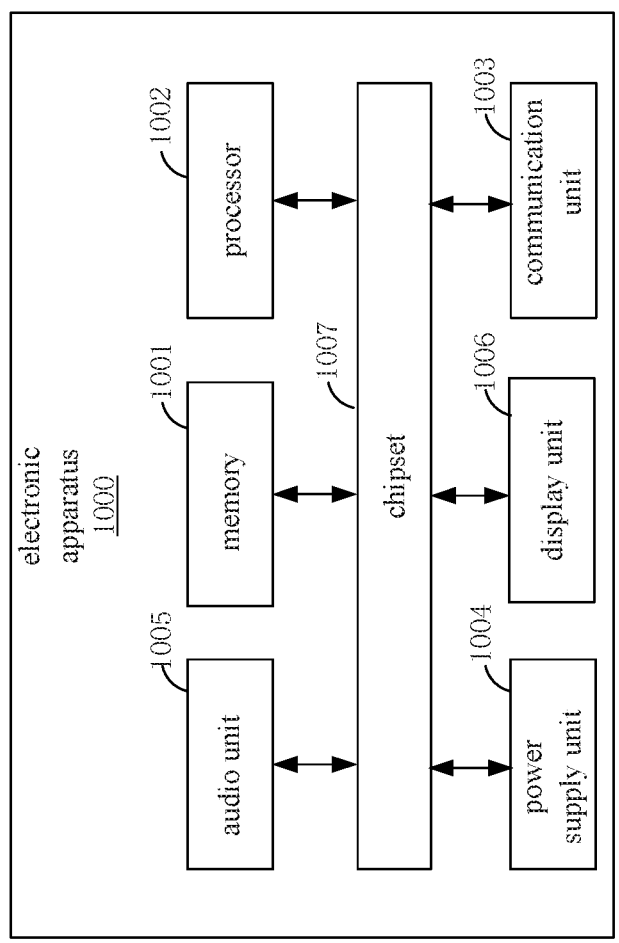
FIG. 10 is a schematic structural block diagram of an electronic apparatus of embodiments of the present disclosure.

As shown in FIG. 10, which is a schematic structural block diagram 1000 of an electronic apparatus of embodiments of the present disclosure, the electronic apparatus 1000 may include: a memory 1001 and a processor 1002.

The memory 1001 may be configured to store programs. In addition to the above programs, the memory 1001 may be configured to store other data to support operations on the electronic apparatus 1000. The examples of these data may include instructions of any applications or methods operated on the electronic apparatus 1000, contact data, phone book data, messages, pictures, videos, and the like.

The memory 1001 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

In some examples, the memory 1001 may be coupled to the processor 1002 and contain instructions stored thereon. The instructions may cause the electronic apparatus 1000 to perform operations upon being executed by the processor 1002, the operations may include:

predicting a complete expression based on an intermediate result of speech recognition;

generating a response message based on the predicted complete expression;

outputting the response message in response to satisfying a response condition.

As embodiments of another electronic apparatus, the above operations may include:

predicting one or more complete expressions based on one or more intermediate results of speech recognition, respectively, and generating one or more response messages based on the predicted one or more complete expressions, respectively;

comparing a final result with the one or more complete expressions in response to of the final result of speech recognition and selecting a response message as output from the one or more response messages corresponding to the one or more complete expressions satisfying a threshold of similarity, if there are one or more complete expressions satisfying the threshold of similarity.

More particularly, the predicting one or more complete expressions based on one or more intermediate results of speech recognition, respectively, and generating one or more response messages based on the predicted one or more complete expressions, respectively may include:

Establishing one or more threads in response to the one or more intermediate results of speech recognition, each or the one or more threads may perform the predicting on the complete expressions and the generating of the response messages in parallel.

More particularly, the above operations may further include:

calculating gain of the complete expressions predicted by the one or more threads and determining whether each thread should be retained or abandoned according to the calculated gain for each thread, wherein the gain represents an accuracy of the predicting on the complete expression and/or a time gap which can be covered by the complete expression.

More particularly, the selecting a response message as output from the one or more response messages corresponding to the one or more complete expressions satisfying a threshold of similarity may include:

selecting a response message satisfying one of the following conditions or both of the following conditions as output from the one or more response messages corresponding to the one or more complete expressions satisfying a threshold of similarity: 1, the response message corresponds to a complete expression with the highest similarity with respect to the final result; the response message is generated first.

As another embodiment of another electronic apparatus, the above operations may include:

obtaining a plurality of response messages generated with respect to the speech input by a user in each turn, and writing the responses into a queue in an order of generating sequence;

detecting a timing for outputting a response message and performing a processing on the plurality of response messages in the queue according to a preset outputting strategy for outputting response messages, the processing performed on plurality of response messages in the queue include: one of a processing of outputting in queue and a processing of interrupting outputting; or one of a processing of outputting in queue and a processing of abandoning; or one of a processing of outputting in queue, a processing of interrupting outputting, and a processing of abandoning.

More particularly, the processing of outputting in queue includes: outputting in an order of sequence for writing into the queue. The processing of interrupting outputting includes: outputting one or more response messages in the queue immediately. The processing of abandoning includes: abandoning one or more response messages in the queue.

More particularly, the outputting strategy for outputting response messages may include: performing the processing of interrupting outputting when it is necessary to output an important and/or urgent response messages; performing the processing of abandoning when a response message written into a queue is over a present threshold in amount and/or length.

Detailed description has been made on the above operations in the above embodiments of method and device. The description on the above operations may be applied to electronic apparatus 1000. That is to say, the specific operations mentioned in the above embodiments may be recorded in memory 1001 in program and be performed by processor 1002.

Furthermore, as shown in FIG. 10, the electronic apparatus 1000 may further include: a communication unit 1003, a power supply unit 1004, an audio unit 1005, a display unit 1006, chipset 1007, and other units. Only part of units are exemplarily shown in FIG. 10 and it is obvious to one skilled in the art that the electronic apparatus 1000 only includes the units shown in FIG. 10.

The communication unit 1003 may be configured to facilitate wireless or wired communication between the c electronic apparatus 1000 and other apparatuses. The electronic apparatus may be connected to wireless network based on communication standard, such as WiFi, 2G, 3G, or their combination. In an exemplary example, the communication unit 1003 may receive radio signal or radio related information from external radio management system via, radio channel. In an exemplary example, the communication unit 1003 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 1004 may be configured to supply power to various units of the electronic device. The power supply unit 1004 may include a power supply management system, one or more power supplies, and other units related to power generation, management, and allocation.

The audio unit 1005 may be configured to output and/or input audio signals. For example, the audio unit 1005 may include a microphone (MIC). When the electronic apparatus in an operation mode, such as calling mode, recording mode, and voice recognition mode, the MIC may be configured to receive external audio signals. The received audio signals may he further stored in the memory 1001 or sent via the communication unit 1003. In some examples, the audio unit 1005 may further include a speaker configured to output audio signals.

The display unit 1006 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 1001, processor 1002, communication unit 1003, power supply unit 1004, audio unit 1005 and display unit 1006 may be connected with the chipset 1007. The chipset 1007 may provide interface between the processor 1002 and other units of the electronic apparatus 1000. Furthermore, the chipset 1007 may provide interface for each unit of the electronic apparatus 1000 to access the memory 1001 and communication interface for accessing among units.

Example Clauses

A. A method, including:
predicting a complete expression based on an intermediate result of speech recognition;
generating a response message based on the predicted complete expression; and
outputting the response message in response to satisfying a response condition.

B. The method according to paragraph A, wherein the predicting a complete expression based on an intermediate result of speech recognition includes:
predicting a complete expression based on an intermediate result n a form of phonetic symbol sequence output by an acoustic model module, and/or predicting a complete expression based on an intermediate result in a form of text output by a language model module.

C. The method according to paragraph A, wherein the outputting the response message in response to satisfying a response condition includes:
outputting a response message in response to generating a final result of speech recognition.

D. A method, including:
predicting one or more complete expressions based on one or more intermediate results of speech recognition, respectively, and generating one or more response messages based on the predicted one or more complete expressions, respectively;
comparing a final result with the one or more complete expressions in response to generating the final result of speech recognition, and selecting a response message as output from the one or more response messages corresponding to the one or more complete expressions satisfying a threshold of similarity, if there are one or more complete expressions satisfying the threshold of similarity.

E. The method according to paragraph D, wherein the predicting one or more complete expressions based on one or more intermediate results of speech recognition, respectively, and generating one or more response messages based on the predicted one or more complete expressions, respectively includes:
establishing one or more threads in response to the one or more intermediate results of speech recognition, each of the one or more threads performs the predicting on the complete expressions and the generating of the response messages in parallel.

F. The method according to paragraph E, the method further includes:
calculating gain of the complete expressions predicted by the one or more threads and determining whether each thread is to be retained or abandoned according to the calculated gain for each thread, wherein the gain represents an accuracy of the predicting on the complete expression and/or a time gap which can be covered by the complete expression.

G. The method according to paragraph D, wherein the selecting a response message as output from the one or more response messages corresponding to the one or more complete expressions satisfying a threshold of similarity includes:
selecting a response message satisfying one of the following conditions or both of the following conditions as output from the one or more response messages corresponding to the one or more complete expressions satisfying a threshold of similarity:
the response message corresponds to a complete expression with the highest similarity with respect to the final result;
the response message is generated first.

H. The method according to paragraph E, wherein the method further includes, after establishing one or more threads,
storing the complete expression predicted by each thread in association with a thread identification of the thread
the selecting a response message as output from the one or more response messages corresponding to the one or more complete expressions satisfying a threshold of similarity includes:
obtaining a thread identification according to the determined complete expression satisfying the threshold of similarity, and obtaining a response message generated by a thread corresponding thereto according to the thread. identification to output the response message.

I. A device, including:
a speech recognition module, configured to perform speech recognition on a speech input by a user to generate an intermediate result of speech recognition;
a language predicting module, configured to predict a complete expression according to the intermediate result;
a response message generating module, configured to generate a response message according to the complete expression; and
a response message outputting module, configured to output the response message in response to satisfying a response condition.

J. The device according to paragraph I, wherein the speech recognition module includes an acoustic model module and a language model module, and the predicting a complete expression based on an intermediate result of speech recognition includes:

predicting a complete expression based on an intermediate result in a form of phonetic symbol sequence output by an acoustic model module, and/or predicting a complete expression based on an intermediate result in a form of text output by a language model module.

K. The device according to paragraph I, wherein the speech recognition module is further configured to generate a final result of speech recognition, the outputting the response message in response to the satisfying of a response condition includes:

outputting a response message in response to the generating of a final result of speech recognition.

L. A device, including:

a continuous speech recognition module, configured to perform continuous speech recognition on a user's speech input by a user to generate one or more intermediate results of speech recognition and a final result;

a language predicting module, configured to predict one or more complete expressions based on the one or more intermediate results of speech recognition, a response message generating module, configured to generate one or more response messages based on the one or more complete expressions; and a response message outputting module, configured to compare the final result with the one or more complete expressions in response to the generating the final result of speech recognition and select a response message as output from the one or more response messages corresponding to the one or more complete expressions satisfying a threshold of similarity, if there are one or more complete expressions satisfying the threshold of similarity.

M. The device according to paragraph L, wherein the device further includes:

a thread management module, configured to establish one or more threads in response to the one or more intermediate results of speech recognition output by the continuous speech recognition module, each of the one or more threads calls the language predicting module and the response message generating module in parallel to perform the predicting on the complete expressions and the generating of the response messages.

N. The device according to paragraph M, wherein the thread management module is further configured to:

calculate gain of the complete expressions predicted by the one or more threads and determine whether each thread is to be retained or abandoned according to the calculated gain for each thread, wherein the gain represents an accuracy of the predicting on the complete expression and/or a time gap which can be covered by the complete expression.

O. The device according to paragraph L, wherein the selecting a response message as output from the one or more response messages corresponding to the one or more complete expressions satisfying a threshold of similarity includes:

selecting a response message satisfying one of the following conditions or both of the following conditions as output from the one or more response messages corresponding to the one or more complete expressions satisfying a threshold of similarity:

the response message corresponds to a complete expression with the highest similarity with respect to the final result;

the response message is generated first.

P. An electronic apparatus, including:

a processing unit; and a memory, coupled to the processing unit and containing instructions stored thereon, the instructions cause the electronic apparatus to perform operations upon being executed by the processing unit, the operations include:

predicting a complete expression based on an intermediate result of speech recognition;

generating a response message based on the predicted complete expression; and outputting the response message in response to satisfying a response condition.

Q. An electronic apparatus, including:

a processing unit; and a memory, coupled to the processing unit and containing instructions stored thereon, the instructions cause the electronic apparatus to perform operations upon being executed by the processing unit, the operations include:

predicting one or more complete expressions based on one or more intermediate results of speech recognition, respectively, and generating one or more response messages based on the predicted one or more complete expressions, respectively;

comparing a final result with the one or more complete expressions in response to generating the final result of speech recognition and selecting a response message as output from the one or more response messages corresponding to the one or more complete expressions satisfying a threshold of similarity, if there are one or more complete expressions satisfying the threshold of similarity.

R. The electronic apparatus according to paragraph Q, wherein the predicting one or more complete expressions based on one or more intermediate results of speech recognition, respectively, and generating one or more response messages based on the predicted one or more complete expressions, respectively includes:

establishing one or more threads in response to the one or more intermediate results of speech recognition, each of the one or more threads performs the predicting on the complete expressions and the generating of the response messages in parallel.

S. The electronic apparatus according to paragraph R, the operations further include:

calculating gain of the complete expressions predicted by the one or more threads and determining whether each thread is to be retained or abandoned according to the calculated gain for each thread, wherein the gain represents an accuracy of the predicting on the complete expression and/or a time gap which can be covered by the complete expression.

T. The electronic apparatus according to paragraph Q, wherein the selecting a response message as output from the one or more response messages corresponding to the one or more complete expressions satisfying a threshold of similarity includes:

selecting a response message satisfying one of the following conditions or both of the following conditions as output from the one or more response messages corresponding to the one or more complete expressions satisfying a threshold of similarity:

the response message corresponds to a complete expression with the highest similarity with respect to the final result;

the response message is generated first.

U. A method, including:

obtaining a plurality of response messages generated with respect to a speech input by a user in each turn and writing the response messages into a queue in an order of generating sequence;

detecting a timing for outputting a response message and performing a processing on the plurality of response messages in the queue according to a preset outputting strategy for outputting response messages, the processing performed on plurality of response messages in the queue includes: one of a processing of outputting in queue and a processing of interrupting outputting; or one of a processing of outputting in queue and a processing of abandoning; or one of a processing of outputting in queue, a processing of interrupting outputting, and a processing of abandoning.

wherein the processing of outputting in queue includes: outputting in an order of sequence for writing into the queue;

the processing of interrupting outputting includes: outputting one or more response messages in the queue immediately; and the processing of abandoning includes: abandoning one or more response messages in the queue.

V. The method according to paragraph U, wherein the outputting strategy for outputting response messages includes:

performing the processing of interrupting outputting when it is necessary to output an important and/or urgent response messages; and performing the processing of abandoning when a response message written into a queue is over a present threshold in amount and/or length.

W. A device, including:

a turn coordinator module, configured to obtain a plurality of response messages generated with respect to a speech input by a user in each turn and write the response messages into a queue in an order of generating sequence;

rhythm coordinator module, configured to detect a timing for outputting a response message and perform a processing on the plurality of response messages in the queue according to a preset outputting strategy for outputting response messages, the processing performed on plurality of response messages in the queue includes: ne of a processing of outputting in queue and a processing of interrupting outputting; or one of a processing of outputting in queue and a processing of abandoning; or one of a processing of outputting in queue, a processing of interrupting outputting, and a processing of abandoning, wherein the processing of outputting in queue includes: outputting in an order of sequence for writing into the queue;

the processing of interrupting outputting includes: outputting one or more response messages in the queue immediately; and the processing of abandoning includes: abandoning one or more response messages in the queue.

X. The device according to paragraph W, wherein the outputting strategy for outputting response messages includes:

performing the processing of interrupting outputting when it is necessary to output an important and/or urgent response messages; and performing the processing of abandoning when a response message written into a queue is over a present threshold in amount and/or length.

Y. An electronic apparatus, including:

a processing unit; and a memory, coupled to the processing unit and containing instructions stored thereon, the instructions cause the electronic apparatus to perform operations upon being executed by the processing unit, the operations include:

obtaining a plurality of response messages generated with respect to a speech input by a user in each turn and writing the response messages into a queue in an order of generating sequence;

detecting a timing for outputting a response message and performing a processing on the plurality of response messages in the queue according to a preset outputting strategy for outputting response messages, the processing performed on plurality of response messages in the queue include: one of a processing of outputting in queue and a processing of interrupting outputting; or one of a processing of outputting in queue and a processing of abandoning; or one of a processing of outputting in queue, a processing of interrupting outputting, and a processing of abandoning, wherein the processing of outputting in queue includes: outputting in an order of sequence for writing into the queue;

the processing of interrupting outputting includes: outputting one or more response messages in the queue immediately; and the processing of abandoning includes: abandoning one or more response messages in the queue.

Z. The electronic apparatus according to paragraph Y, wherein the outputting strategy for outputting response messages includes:

performing the processing of interrupting outputting when it is necessary to output an important and/or urgent response messages;

performing the processing of abandoning when a response message written into a queue is over a present threshold in amount and/or length.

Conclusion

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having al least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C. etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and. B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some more implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A method, comprising:
predicting one or more complete expressions based on one or more intermediate results of speech recognition, and generating one or more response messages based on the predicted one or more complete expressions;
in response to obtaining a final result of speech recognition as determined by a pause detected during the speech recognition, comparing the final result of the speech recognition with the predicted one or more complete expressions to select a response message from the one or more response messages based on similarity between the final result and a predicted one or more complete expression corresponding with the response message; and
outputting the response message based on the similarity satisfying a threshold of similarity.

2. The method according to claim 1, wherein the predicting one or more complete expressions based on one or more intermediate results of speech recognition, respectively, and generating one or more response messages based on the predicted one or more complete expressions, respectively comprises:
establishing one or more threads in response to the one or more intermediate results of speech recognition, each of the one or more threads performs the predicting on the complete expressions and the generating of the response messages in parallel.

3. The method according to claim 1, the method further comprises:
calculating gain of the complete expressions predicted by the one or more threads and determining whether each thread is to be retained or abandoned according to the calculated gain for each thread, wherein the gain represents an accuracy of the predicting on the complete expression and/or a time gap which can be covered by the complete expression.

4. The method according to claim 1, wherein the selecting a response message as output from the one or more response messages corresponding to the one or more complete expressions satisfying a threshold of similarity comprises:
selecting a response message satisfying one of the following conditions or both of the following conditions as output from the one or more response messages corresponding to the one or more complete expressions satisfying a threshold of similarity:
the response message corresponds to a complete expression with the highest similarity with respect to the final result;

the response message is generated first.

5. The method according to claim 2, wherein the method further comprises: after establishing one or more threads,
storing the complete expression predicted by each thread in association with a thread identification of the thread
the selecting a response message as output from the one or more response messages corresponding to the one or more complete expressions satisfying a threshold of similarity comprises:
obtaining a thread identification according to the determined complete expression satisfying the threshold of similarity, and obtaining a response message generated by a thread corresponding thereto according to the thread identification to output the response message.

6. A device, comprising:
at least one processor; and
memory including instructions that, when executed by the at least one processor, cause the at least one processor to perform operations to:
perform continuous speech recognition on a user's speech input by a user to generate one or more intermediate results of speech recognition and a final result;
predict one or more complete expressions based on the one or more intermediate results of speech recognition,
generate one or more response messages based on the one or more complete expressions;
in response to generation of the final result of the continuous speech recognition as determined by a pause detected during the continuous speech recognition, compare the final result of the speech recognition with the predicted one or more complete expressions to select a response message from the one or more response messages based on similarity between the final result and a predicted one or more complete expression corresponding with the response message; and
output the response message based on the similarity satisfying a threshold of similarity.

7. The device according to claim 6, the memory further comprising instructions that cause the at least one processor to perform operations to:
establish one or more threads in response to the one or more intermediate results of speech recognition output, wherein each of the one or more threads predict a complete expression of the one or more complete expressions and generate a corresponding response message of the one or more response messages.

8. The device according to claim 7, the memory further comprising instructions that cause the at least one processor to perform operations to:
calculate gain of the complete expressions predicted by the one or more threads and determine whether each thread is to be retained or abandoned according to the calculated gain for each thread, wherein the gain represents an accuracy of the predicting on the complete expression and/or a time gap which can be covered by the complete expression.

9. The device according to claim 6, wherein the instructions to select a response message as output from the one or more response messages corresponding to the one or more complete expressions satisfying a threshold of similarity comprises instructions to:
select a response message satisfying one of the following conditions or both of the following conditions as output from the one or more response messages corresponding to the one or more complete expressions satisfying a threshold of similarity:
the response message corresponds to a complete expression with the highest similarity with respect to the final result; and
the response message is generated first.

10. An electronic apparatus, including:
a processing unit; and
a memory, coupled to the processing unit and containing instructions stored thereon, the instructions cause the electronic apparatus to perform operations upon being executed by the processing unit, the operations comprise:
predicting one or more complete expressions based on one or more intermediate results of speech recognition, and generating one or more response messages based on the predicted one or more complete expressions;
in response to obtaining a final result of speech recognition as determined by a pause detected during the speech recognition, comparing the final result of the speech recognition with the predicted one or more complete expressions to select a response message from the one or more response messages based on similarity between the final result and a predicted one or more complete expression corresponding with the response message; and
outputting the response message based on the similarity satisfying a threshold of similarity.

11. The electronic apparatus according to claim 10, wherein the predicting one or more complete expressions based on one or more intermediate results of speech recognition, respectively, and generating one or more response messages based on the predicted one or more complete expressions, respectively comprises:
establishing one or more threads in response to the one or more intermediate results of speech recognition, each of the one or more threads performs the predicting on the complete expressions and the generating of the response messages in parallel.

12. The electronic apparatus according to claim 11, the operations further include:
calculating gain of the complete expressions predicted by the one or more threads and determining whether each thread is to be retained or abandoned according to the calculated gain for each thread, wherein the gain represents an accuracy of the predicting on the complete expression and/or a time gap which can be covered by the complete expression.

13. The electronic apparatus according to claim 10, wherein the selecting a response message as output from the one or more response messages corresponding to the one or more complete expressions satisfying a threshold of similarity includes:
selecting a response message satisfying one of the following conditions or both of the following conditions as output from the one or more response messages corresponding to the one or more complete expressions satisfying a threshold of similarity:
the response message corresponds to a complete expression with the highest similarity with respect to the final result; and
the response message is generated first.

* * * * *